(12) United States Patent
Shi (10) Patent No.: US 10,321,517 B2
(45) Date of Patent: Jun. 11, 2019

(54) SYSTEM AND METHOD FOR CONNECTING AIRCRAFT TO NETWORKS ON GROUND

(71) Applicant: The Boeing Company, Chicago, IL (US)

(72) Inventor: Fong Shi, Clyde Hill, WA (US)

(73) Assignee: THE BOEING COMPANY, Chicago, IL (US)

( * ) Notice: Subject to any disclaimer, the term of this patent is extended or adjusted under 35 U.S.C. 154(b) by 803 days.

(21) Appl. No.: 14/596,523

(22) Filed: Jan. 14, 2015

(65) Prior Publication Data
US 2016/0205724 A1 Jul. 14, 2016

(51) Int. Cl.
*H04B 7/185* (2006.01)
*H04L 12/40* (2006.01)
*H04W 84/06* (2009.01)
*H04W 88/16* (2009.01)
*H04W 92/02* (2009.01)

(52) U.S. Cl.
CPC ........ *H04W 92/02* (2013.01); *H04B 7/18506* (2013.01); *H04L 2012/4028* (2013.01); *H04W 84/06* (2013.01); *H04W 88/16* (2013.01)

(58) Field of Classification Search
CPC ..... H04W 92/02; H04W 84/06; H04W 88/16; H04B 7/18506; H04L 2012/4028
See application file for complete search history.

(56) References Cited

U.S. PATENT DOCUMENTS

| 9,446,856 B1* | 9/2016 | Roling | B64D 47/00 |
| 2004/0165545 A1* | 8/2004 | Cook | H04W 84/12 370/315 |
| 2007/0183435 A1 | 8/2007 | Kettering et al. | |
| 2014/0136730 A1 | 5/2014 | Wahler | |
| 2015/0349882 A1* | 12/2015 | Lamkin | H04B 10/1123 398/121 |

FOREIGN PATENT DOCUMENTS

| EP | 1793512 A2 | 6/2007 |
| EP | 2775629 A1 | 9/2014 |
| WO | 2006137901 A2 | 12/2006 |
| WO | 2014/078249 A1 | 5/2014 |

OTHER PUBLICATIONS

European Search Report for EP 15191119, dated May 6, 2016.

\* cited by examiner

*Primary Examiner* — Eric Myers
(74) *Attorney, Agent, or Firm* — Patterson + Sheridan, LLP (57) ABSTRACT

A system and method includes a core network located on an aircraft and a gateway included with the core network. The gateway connects with at least two of a wireless link, an optical link, a wired link and a crew wireless link. The gateway is configured to switch between the wireless link, the optical link, the wired link and the crew wireless link to transfer data from the core network to a telecom service provider network, an airport service provider network and an airport infrastructure network based on availability of connectivity service and data transfer conditions.

18 Claims, 6 Drawing Sheets

SYSTEM AND METHOD FOR CONNECTING AIRCRAFT TO NETWORKS ON GROUND

FIELD

The systems and methods relate to providing communication connections, e.g., for aircraft on the ground.

BACKGROUND

Airliners generally keep records of their flights, and the flight information can be used for the maintenance, repair and operations of the airplanes. Crewmembers can use onboard radios to communicate the record data to the airlines' operation office through ground based aircraft communications addressing and reporting system (ACARS) stations and/or communication satellites. Data going through such stations or satellites can be cost prohibitive to airlines if the amount of data to be exchanged becomes large. The speed of such data transmissions can also be slow. At some airports, the airplane's can also use a terminal wireless local area unit (TWLU) based on IEEE802.11b/g to transfer data, but the TWLU typically cannot exceed a limited range near the airport gate, and an airplane gate turnaround time may not allow for a complete exchange of the data. Crewmembers hand-carrying laptops or magnetic media can board the airplane and exchange data manually, but this can be slow and expensive due to the need for using trained personnel and having the personnel travel to the airplane, connect the equipment, monitor the transfer, disconnect the equipment, and return to the terminal stations.

SUMMARY

According to one aspect, systems and methods can provide for a core network located on an aircraft and a gateway included with the core network. The gateway connects with at least two of a wireless link, an optical link, a wired link and a crew wireless link. The gateway is configured to switch between the wireless link, the optical link, the wired link and the crew wireless link to transfer data from the core network to a telecom service provider network, an airport service provider network and an airport infrastructure network based on availability of connectivity service and data transfer conditions.

According to another aspect, the systems and methods can provide at least two of a wireless link, an optical link, a wired link and a crew wireless link to transfer data from the aircraft to an airport side. The systems and methods determine data transfer conditions of at least two of a telecom service provider network, an airport service provider network and an airport infrastructure network. The system and methods switch, with a gateway located on the aircraft, to the wireless link, the optical link, the wired link or the crew wireless link based on the determined data transfer conditions.

According to another aspect, the systems and methods can provide a camera configured to record an image of an aircraft. An antenna connects with the camera, the antenna being configure to receive the image and forward the image to an airline server, the airline server to return a processed image for aircraft maintenance.

Other systems, methods, features, and advantages will be or will become apparent upon examination of the following figures and detailed description. It is intended that all such additional systems, methods, features, and advantages be included within this description and be protected by the accompanying claims.

BRIEF DESCRIPTION OF THE DRAWINGS

In association with the following detailed description, reference is made to the accompanying drawings, where like numerals in different figures can refer to the same element.

DETAILED DESCRIPTION

For aircraft flights, when the aircraft is on airport ground it may be important that performance-based information generated onboard the aircraft and operation-based information prepared on ground, be effectively exchanged between the aircraft and airlines' operation centers, which may or may not be located at airport, within an aircraft turnaround time. A quick turnaround can be less than about 45 minutes, but it can vary. Systems and methods are described for a communication gateway connecting aircraft to aircraft operation centers while the aircraft park and taxi on ground, e.g., at airfields and airports.

Figure 1:
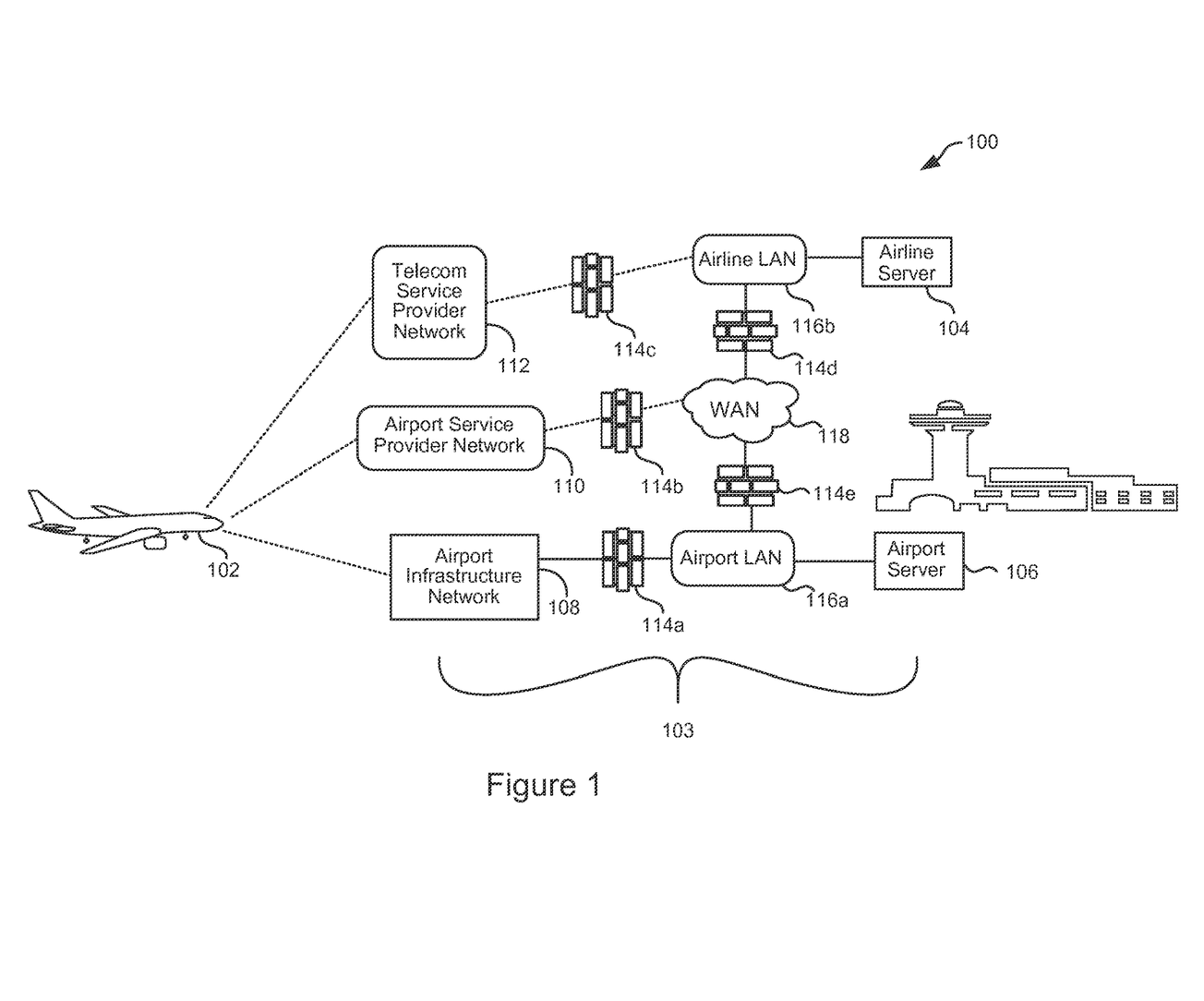
FIG. 1 is a block diagram of an example airport communication network for connecting an aircraft when on the ground.

FIG. 1 is a block diagram of an example airport communication network 100 for connecting an aircraft 102 to the airport side 103 when the aircraft 102 is on the ground. The aircraft 102 can connect with an airline server 104 and/or an airport server 106 to provide aircraft data to the airline server 104 and/or airport server 106. The airline server 104 can be located near the aircraft 102 and/or remotely from the aircraft 102. The aircraft 102 can store large amounts of performance data during the flight. For preventative and predictive maintenance, aircraft data can be taken from engine health monitoring and management systems. Such collection of data also includes error messages from other line replacement units (LRU). On the ground, airline operations, e.g., including the airline server 104 and/or airport server 106, are increasingly becoming information driven. Loadable software airplane parts (LSAP) for operation configurations, navigation data, terminal charts, airport maps, electronics documents and other contents of the electronic flight bag (EFB), software applications and updates can be dispatched to the aircraft. The volume of such data can reach hundreds of gigabytes per flight, and can keep increasing by airlines and aircraft manufacturers in the future.

To transfer the aircraft data from the aircraft 102 to the airport server 106 and/or airline server 104, the aircraft 102 can use one or more communication channels of an airport infrastructure network 108, an airport service provider network 110, and/or a telecom service provider network 112. The airport service provider network 110 can include wireless or WiFi services by Aeronautical Radio, Incorporated (ARINC) and Societe Internationale de Telecommunication Aeronautiques (SITA). The airport service provider network 110 can also include other services, e.g., services using Aeronautical Mobile Airport Communications System (AeroMACS) and L-band channel used for ground vehicle dispatches, fuel truck dispatches, ground operations services (repairs) and ground power, etc., and the telecom service provider network 112 can include commercial provider, e.g., AT&T, VERIZON, SPRINT, ROGERS, DOCOMO, etc. When referring to the aircraft 102 sending data, additionally or alternatively data can be uploaded to the aircraft 102 from the airport server 106 and/or airline server 104 using the airport infrastructure network 108, the airport service provider network 110 and/or the telecom service provider network 112.

For secure data transfers, the communication network 100 can include firewalls 114a, b, c, d, e, etc., between the airport infrastructure network 108, airport service provider network 110, telecom service provider network 112, and airport local area network (LAN) 116a, airline LAN 116b or wide area network (WAN) 118, e.g., the Internet, providing connections to the airport server 106 and airline server 104. In one implementation, the firewalls 114a, b, c, d, e may be built into network routers. If the aircraft 102 sends the aircraft data via the airport infrastructure network 108, the aircraft data can be received by the airport server 106. The aircraft data can also be sent from the airport LAN 116a to the WAN 118, and then to the airline LAN 116b to the airline server 104. If the aircraft 102 sends the aircraft data via the telecom service provider network 112, the aircraft data can be received by the airline server 104 and also directed to the airport server 106 via the WAN 118.

Figure 2:
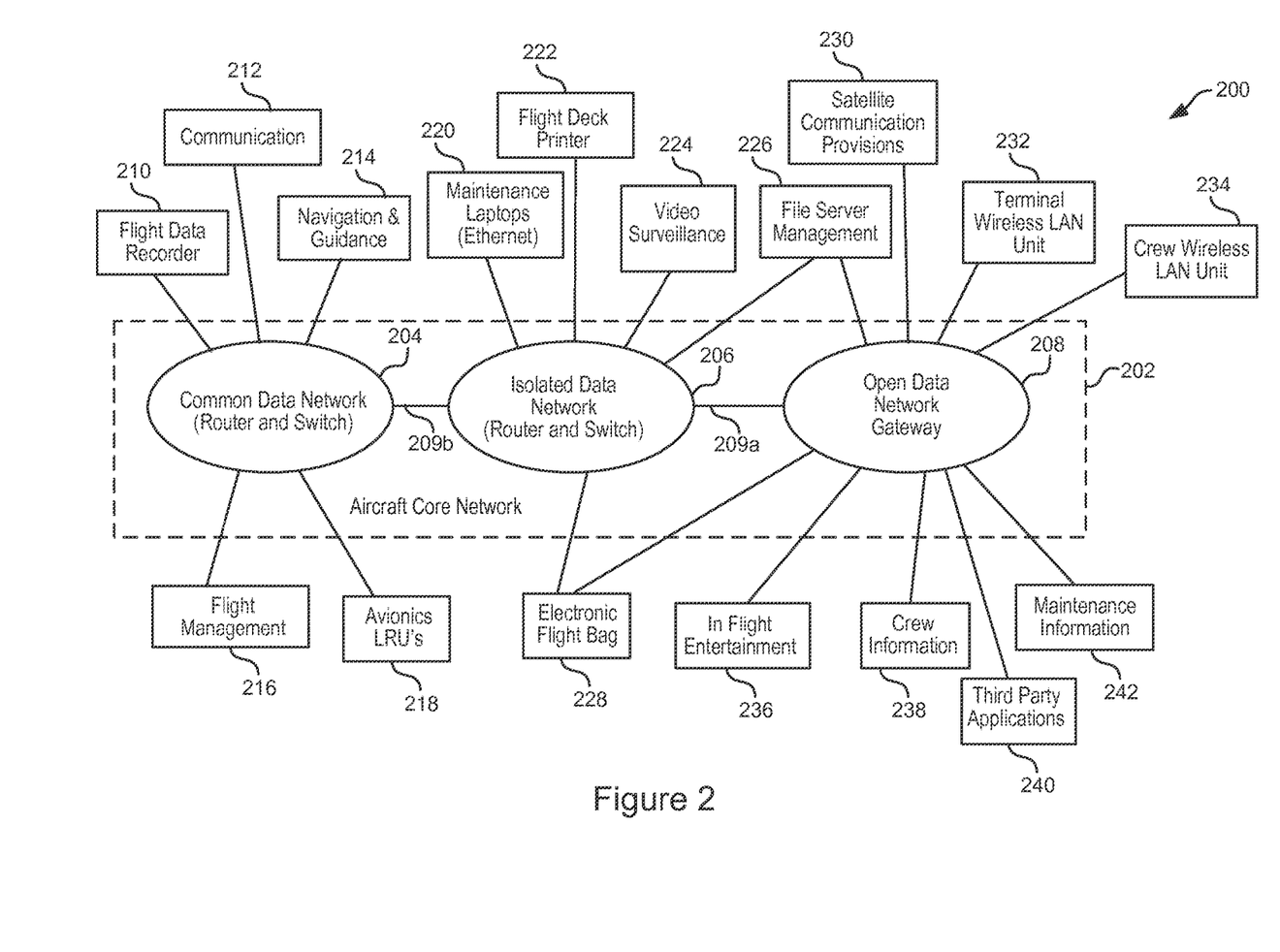
FIG. 2 is a block diagram of an example aircraft communication network located on board the aircraft for communicating between devices on the aircraft.

FIG. 2 is a block diagram of an example aircraft network 200 located on board the aircraft 102 for communicating between devices on the aircraft 102. An aircraft core network 202 can include a common data network 204, an isolated data network 206 and an open data network (ODN) 208. The open data network 208 can connect with the isolated data network 206 via a bus 209a and the isolated data network 206 can connect with the common data network 204 via a bus 209b. The common data network 204 and the isolated data network (IDN) 206 can connect devices via routers and switches, and the open data network 208 can connect devices via gateways, for example. The switches connect multiple devices via LAN's using media access control (MAC) addresses, routers are a secure way to connect devices via LAN and WAN with Internet protocol (IP) addresses, and the gateways can include a processor and memory for connecting and translating data between devices using different architectures, protocols and waveforms.

The devices of the aircraft 102 that connect with the common data network 204 can include a flight data recorder 210, communication devices 212, navigation and guidance devices 214, flight management equipment 216 and avionics LRU's 218. Devices that connect with the isolated data network 206 can include maintenance laptops 220, e.g., via the Ethernet, flight deck printers 222, video surveillance equipment 224, file server management devices 226 and electronic flight bags 228. The file server management devices 226 and electronic flight bags 228 can also connect with the open data network 208, e.g., to send and receive information via the open data network 208. Other devices that connect with the open data network 208 can include satellite communication provisions 230, terminal wireless LAN units 232, crew wireless LAN units 234, in-flight entertainment equipment 236, crew information servers 238, third party applications 240, and maintenance information servers 242.

Figure 3:
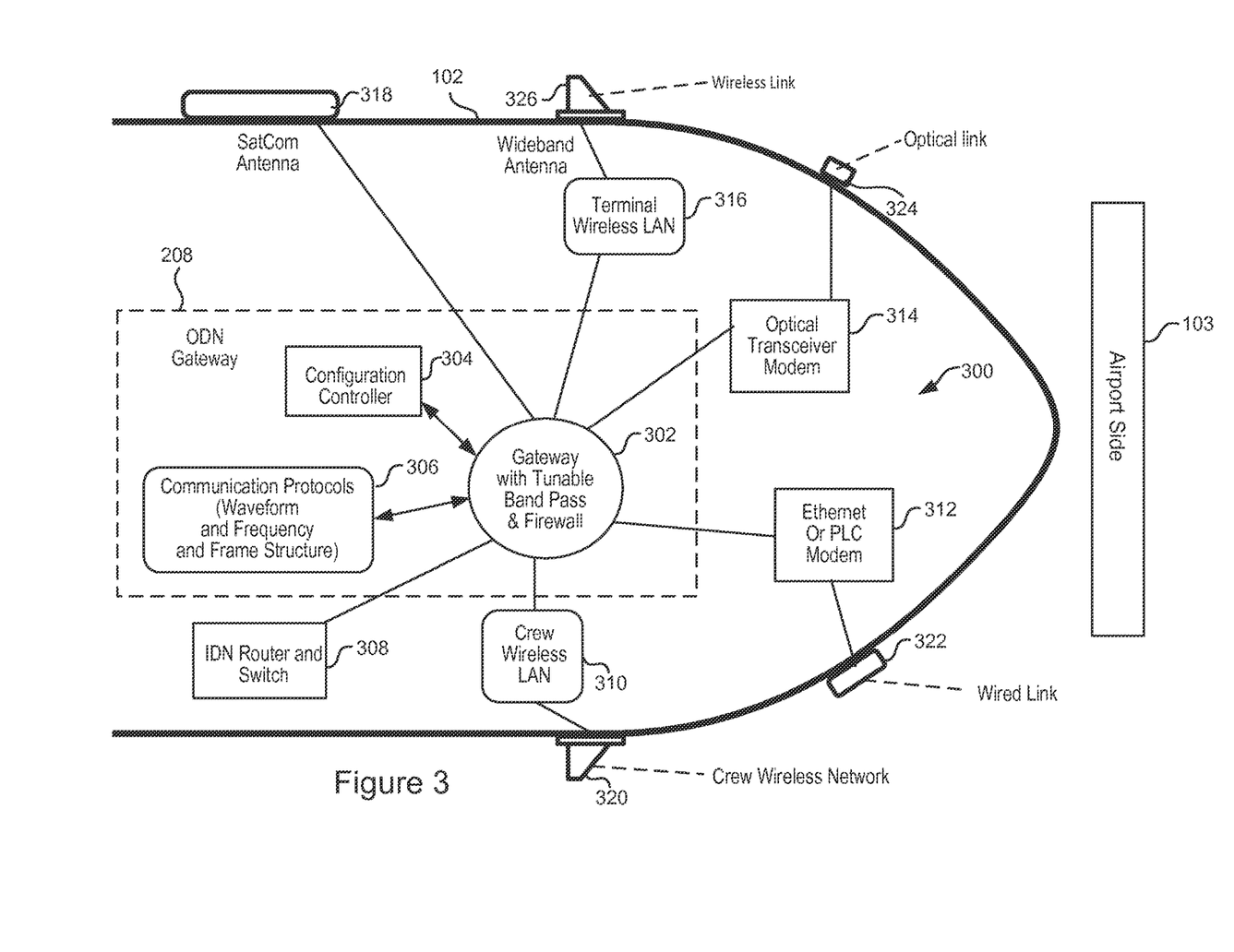
FIG. 3 is a block diagram of an example communication structure for the aircraft.

FIG. 3 is a block diagram of an example communication structure 300 for the aircraft 102. The open data network 208 includes a gateway 302 with tunable band pass and firewall, a configuration controller 304 and communication protocols 306, e.g., for determining waveform, frequency and frame structure. Based on connectivity performance and service fees available at a given airport, an airline can preselect one of the links among wireless, e.g., Wi-Fi, cellular, airport service network, optical, etc., and wired links for exchanging data between the aircraft 102 and airline server 104. Configuration controller 304 may configure proper waveforms, frequencies and frame structures associated with the particular communication link that the airline has chosen for the airport side 103. If link performance degrades or data transfer deteriorates, e.g., due to various reasons including interference, environment conditions, etc., configuration controller 304 switches to another link available at the airport side 103. The configuration controller 304 can also reconfigure waveforms, frequencies and frame structures associated with that link. Controller 304 can also adjusts band pass filters of the gateway 302 to accommodate communication bandwidth and waveforms for that chosen link.

The gateway 302 connects with the IDN router and switch 308, e.g. which provides the isolated data network 206 of FIG. 2. The gateway 302 can perform as a central gateway in the communication structure 300. The gateway 302 can also connect with a crew wireless LAN 310, an Ethernet or a power line communication (PLC) modem 312, an optical transceiver modem 314, a terminal wireless LAN 316 and a satellite communications (SatCom) antenna 318. To connect the aircraft 102 with the airport side 103, the aircraft 102 can include a crew wireless network antenna 320 for sending signals to/from the crew wireless LAN 310, a wired link connector 322 for connecting signals with the Ethernet or PLC modem 312, an optical link connector 324 for connecting signals with the optical transceiver modem 314, and a wireless link antenna 326 for connecting signals with the terminal wireless LAN 316.

Figure 4:
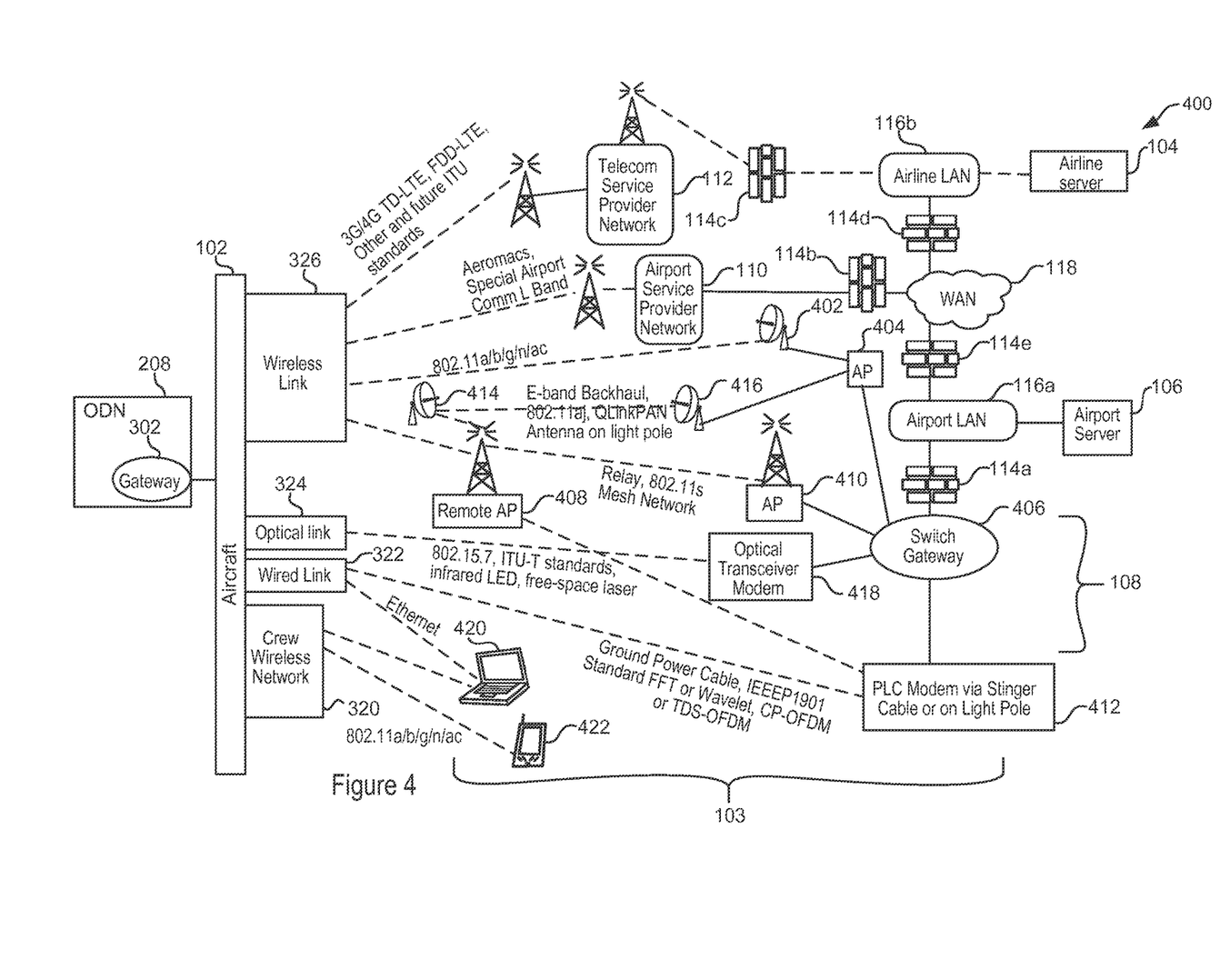
FIG. 4 is a block diagram of an example communication structure for the airport side.

FIG. 4 is a block diagram of an example communication structure 400 for the airport side 103. The gateway 302 is programmed and self-configured to automatically detect available channels on the airport side 103, e.g., within the available wireless spectrum, and to automatically switch to wired channels or ports when they are available at broader speed. The gateway 302 adjusts its transmission or reception parameters accordingly to allow more concurrent communications in a given spectrum or band at a given airport location, e.g., as a form of dynamic spectrum management. The gateway 302 is configured to function as an autonomous networked unit in the communications network 100, exchanging information with other networked systems, e.g., the airport infrastructure network 108, the airport service provider network 110, and/or the telecom service provider network 112. The gateway 302 can also check its own performance to determine its operating environment, channel conditions, link performance, and adjusts its parameter settings to satisfy requirements, operational limitations and regulatory constraints at the airport side 103.

For example, the gateway 302 can support international telecommunication union (ITU) standards of communication for communicating various data from the aircraft 102 to/from the airport side 103 via the wireless link 326. ITU standards include 3G/4G time division long term evolution (TD-LTE), frequency division duplex (FDD)-LTE, etc. communications through the telecom service provider network 112 to the airline server 104 and airport server 106. The gateway 302 translates the data from the aircraft 102 to match the different architectures, protocols and waveforms of the airport side 103. The gateway 302 is also capable of responding to commands and configuring its operation parameters such as waveforms, protocols, frequencies and networking.

Additional or alternative to communicating via the ITU standards, the gateway 302 can communicate data between the aircraft 102 and the airport side 103 using an airport communication L-band, or AeroMACS services, or other special airport band, via the wireless link 326. The L-band communications received from the aircraft 102 are sent via the airport service provider network 110 to the airline server 104 and airport server 106. If both the ITU standard and L-band forms of communication or AeroMACS services are available to the aircraft 102, the gateway 302 can use one of them, e.g., depending on one or more of a detected bandwidth, a speed of the data transmission, an amount of data to transfer, channel conditions, a cost of using the selected channel, etc., e.g., as detected by the gateway 302. For example, some of the channels may be experiencing radio frequency (RF) interference and performing poorly, e.g., slowly.

Additionally or alternatively, the gateway 302 can use the wireless link 326 to communicate data to/from the airport side 103 using institute for electrical and electronic engineers (IEEE) 802.11 a/b/g/n/ac, etc. standard protocol communications. The wireless link 326 sends signals to antenna 402 which connects with an access point 404 and switch gateway 406 located on the airport side 103. The switch gateway 406 connects with the airport LAN 116a and WAN 118 to send the data to the airport server 106 and/or airline server 104. The gateway 302 can use the IEEE 802.11a/b/g/n/ac, etc. standards depending on one or more of availability, a detected bandwidth, a speed of the data transmission, an amount of data to transfer, channel conditions, a cost of using the selected channel, etc.

Additionally or alternatively, the gateway 302 can use the wireless link 326 to communicate data to/from the airport side 103 using remote access point (AP) 408, e.g., which is located remotely from the airport terminals, an a power line communication (PLC) modem 412 via a stinger cable or other power cable, e.g., a power cable to an airport light pole. The PLC modem 412 can connect with the airline server 104 and airport server 106 by way of the switch gateway 406, for example. Additionally or alternatively, the remote access point 408 can connect with an access point 410 to relay data, e.g., via an IEEE 802.11s mesh network. The access point 410 connects with the switch gateway 406 to send the data to the airline server 104 and airport server 106. Additionally or alternatively, the remote access point 408 can connect with an antenna 414 to send data to antenna 416 via E-band backhaul, a personal area network, e.g., QLinkPAN, an IEEE 802.11aj standard. The antenna 414 can be located remotely from the terminals, e.g., positioned on a light pole in remote parking for the aircraft 102. The gateway 302 can choose any of these data transmission options depending on one or more of availability, a detected bandwidth, a speed of the data transmission, an amount of data to transfer, channel conditions, a cost of using the selected channel, etc.

Additionally or alternatively, the gateway 302 can use the optical link 324 to send/receive data between the aircraft 102 and airport side 103. An optical transceiver modem 418 can connect the optical link 324 with the switch gateway 406 for transferring data to/from the airline server 104 and airport server 106. Communication protocols include IEEE 802.15.7, ITU-T standards, infrared light emitting diodes (LEDs), free-space lasers, etc. Additionally or alternatively, the gateway can use the wired link 322 to send/receive data between the aircraft 102 and airport side 103 via the PLC modem 412 connected with the switch gateway 406. That way ground power cable or IEEE 1901 standards can be used. Example PLC modems 412 include FFT by SHARP, TRENDnet, Wavelet by PANASONIC, etc. The wired link 322 can also be used to connect to a crew computer 420, e.g., via Ethernet, for data transfer. The crew wireless network 320 can also wirelessly send/receive data to/from the crew computer 420, e.g., using IEEE 802.11a/b/g/n/ac standards, etc. The crew computer 420 can send/receive the data to/from the airline server 104 and airport server 106, e.g., via the WAN 118 and LANs 116a, b. The crew wireless network 320 can be used to connect with other devices, e.g., a smartphone or tablet 422, e.g., via the IEEE 802.11a/b/g/n/ac standards. The gateway 302 can choose any of these data transmission options depending on one or more of availability, a detected bandwidth, a speed of the data transmission, an amount of data to transfer, channel conditions, a cost of using the selected channel, etc. In some implementations, the gateway 302 may also select the SatCom antenna 318 or ACARS.

Therefore, the airlines can exchange data when the aircraft 102 are taxiing to and from gate, parked at gate, parked at remote airport areas, at maintenance hangars and repair overhaul centers, etc. This would can eliminate handling data manually by either flight crew or ground crew. When fully utilized, broadband connectivity can help airlines to optimize their performance, increase the efficiencies in operations, service and maintenance, and reduce the time and fuel consumption while aircraft 102 are on the ground.

Through authenticated and secured wireless or wired connections, airlines can initiate data transferring between aircraft 102 and airline hosts or airline operation centers using proper wireless access points (AP) and wired internet (Ethernet, fiber optics or other means) installed as a part of an infrastructure at the airport side 103. The data transmissions can be secured, e.g., by digital certificates, encrypted communications through transport layer security or secure sockets layer connections, authenticated network connections for protected WiFi access, e.g., wireless protected access (WPA), WPA2, and virtual private networks (VPNs), etc. Such wireless communication once established may continue before aircraft 102 leave the gate, or until aircraft 102 take off again.

Figure 5:
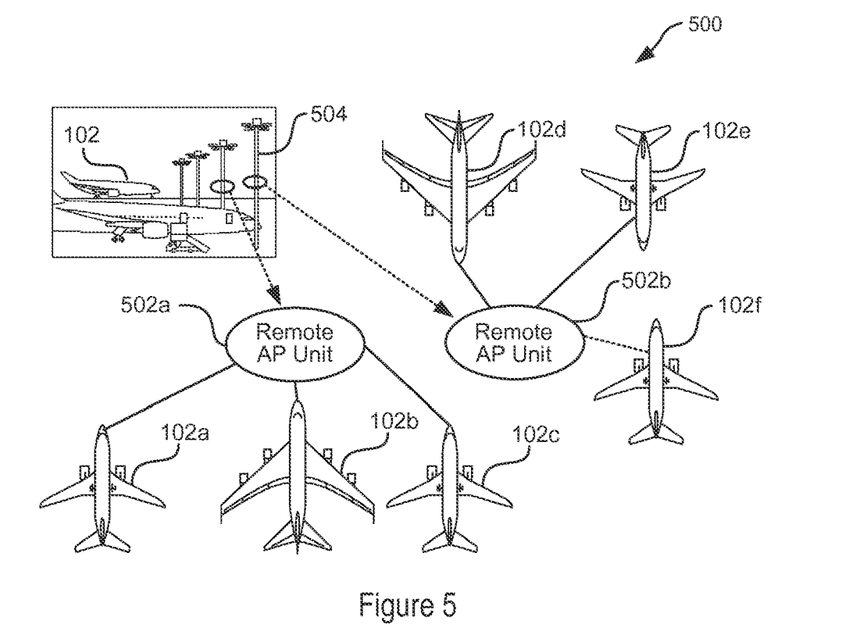
FIG. 5 is a block diagram of an example communication structure for remotely connecting the aircraft to the airport side.

FIG. 5 is a block diagram of an example communication structure 500 for remotely connecting the aircraft 102 to the airport side 103. For example, airlines can park their aircraft 102 at airport remote areas, up to several miles away from the terminal gate area. Aircraft 102 parked at the airport remote areas are beyond the reach of 802.11b/g signals. To seamlessly cover an entire airport connecting multiple aircraft 102a, b, c, d, e, f to the airport server 106, airline server 104 or other airlines operation offices at broadband speed, the airport side 103 can include remote AP units 502a, b (e.g., remote AP 408 of FIG. 4). The remote AP units 502a, b can be positioned on light poles 504, etc. The ODN 208 on the aircraft 102 can connect with the remote AP units using, for example, the wireless link 326, the optical link 324, the wired link 322 and or the crew wireless network 320. Communication protocols include IEEE 802.11b/g/n, WiFi, mobile 3G and 4G LTE, mmW (IEEE 802.11aj), the civil aviation band, IEEE P1901, etc. Communication can include 1, 6, 11 non-overlapping channels, FDD and TD, 40.5 to 50.2 GHz in mmW band, 1.8 GHz, L-band, AeroMACS, power line communication (PLC), etc.

The ODN network 208 combines the possible wireless and wired connectivity wherever available on airport ground, whether the aircraft 102 are on taxiway or parked. To connect the aircraft 102 on the airport grounds, when the aircraft 102 is parked at terminal gates or remote parking stands, or are in taxiing motion, a the ODN 208 selects and communicates over available broadband connectivity channels on airport side 103 premises. Broadband data exchange can be accomplished by the on-board ODN 208 and the off-board communication infrastructure on ground. The gateway 302 chooses available backhaul channels among cellular, special civil aviation network and mmW band, optical communication and power line communication, along with ground based wired Ethernet and optical communication infrastructures. For wireless connectivity, the airport side 103 infrastructure may include networked APs 404, 408, 410 with sectioned, omnidirectional, directional, and beam forming antennas 402, 414, 416, to support gate terminals, remote parking areas and taxiways for both Line of Sight (LoS) and Beyond Line of Sight (BLoS) communication operations. The combined options can offer broad data rates, distance and seamless coverage.

For example, the IEEE 802.11 family includes unlicensed b/g standards, a/n standards and ac standard operating in 2.4G and 5G. As licensed FDD based 4G LTE mobile services become widely available on a global scale, TD based 4GLTE services are gaining popularity in many countries due to its efficient spectrum utilization. Communications in L-band and millimeter-wave band can also be used for ground operations and services at airports, e.g., for aviation markets in emerging countries. The gateway 302 is dynamically reconfigurable or re-definable by control software in real time. The gateway 302 can connect or bridge different broadband technologies, between the aircraft 102 and airport side 103 ground infrastructure depending on what is available at an airport, and enable data transfer while the aircraft 102 is at located the gate, in remote parking area, and/or during taxiing.

In this way, the ODN 208 can connect an aircraft 102 through airport or ground infrastructure to the airport server 106, airline server 104, and other airline operation centers. The ODN 208 can be compatible with the global communication standards. The gateway 302 can elect available channels with broadband data rate for download and upload between an aircraft 102 and the airport side 103 infrastructure network. The aircraft 102 can include an ultra-wideband antenna element to cover the 400 MHz to 6 GHz band, for example, whether unlicensed or licensed. The airport side 103 can simultaneously connects multiple aircraft 102 to airline's operation centers, e.g., airline server 104 and airport server 106, via the ground infrastructure. The gateway 302 selects proper carrier frequencies and/or modulation schemes for the APs according to the channel conditions, and can adapt to changing channel or multipath conditions caused by building structures, adjacent aircraft, crew members and ground vehicles moving around the aircraft 102.

Signal propagation is affected by scattering (deviated from straight line due to reflection), fading (multipath media and obstacle shadow) and attenuation (one over square of distance). In addition to measuring received signal strength, periodically inserting prefix pilot signals in transmission over time and frequency, and subsequent deletion of such after receiving, the channel response can be reconstructed by exploiting its correlation in time and frequency. For example, after demodulation of the signals, the received information can be correlated in time and frequency. The effects of the estimation errors are evaluated in the receiver and can be fed back to the transmitter for optimization. Estimating channel conditions and adapting transmission to the current channel conditions achieves reliable data communication at high rate.

Figure 6:
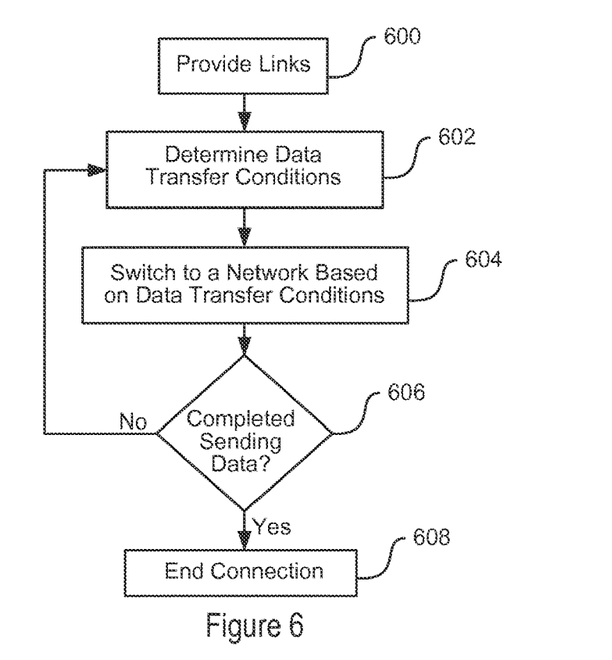
FIG. 6 is a flowchart of an example logic of the gateway.

FIG. 6 is a flowchart of an example logic of the gateway 302. The aircraft can provide at least two of a wireless link, an optical link, a wired link and a crew wireless link to transfer data from an aircraft 102 to an airport side 103 (600). The gateway 302 determines data transfer conditions of at least two of the telecom service provider network 112, the airport service provider network 110 and the airport infrastructure network 108 (602). In one example, the gateway 302 can access airport configuration maps stored on the aircraft 102 to determine what types of channels are available to the gateway 302 based on an infrastructure of the airport side 103 according to the airport configuration maps. The gateway 302 switches to the wireless link, the optical link, the wired link or the crew wireless link based on availability of connectivity service and/or the determined data transfer conditions (604). The data transfer conditions can include one or more of the detected bandwidth, the speed of the data transmission, the amount of data to transfer, channel conditions and the cost of using the selected channel. The gateway (302) can determine, e.g., periodically, if all the data has been transferred between the aircraft 102 and the airport side 103, e.g., to or from the aircraft 102 (606). If all of the data has not been successfully transferred, the gateway 302 can further determine the data transfer conditions (602). Otherwise, the gateway 302 can end the connection between the aircraft 102 and the airport side 103 (608).

Figure 7:
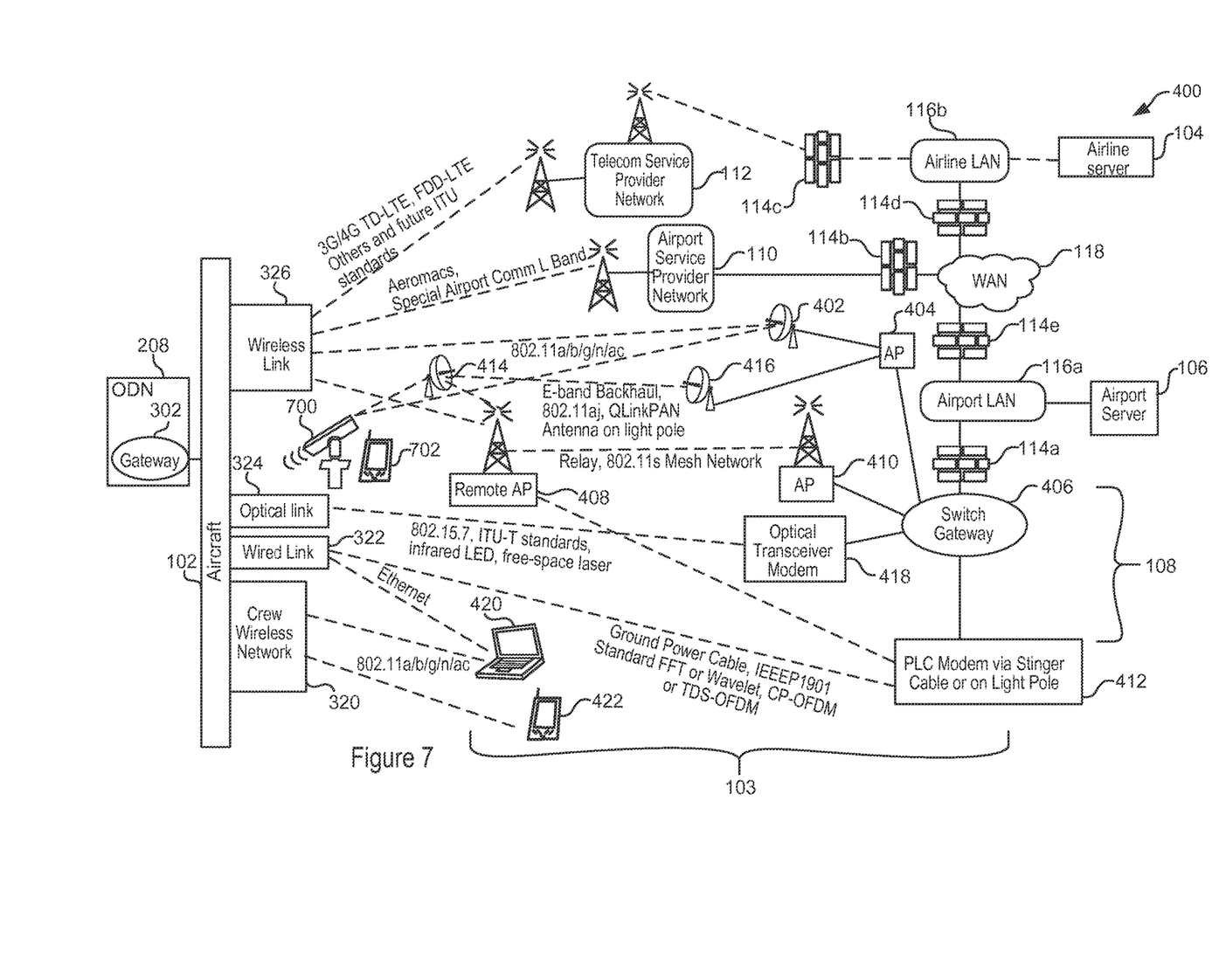
FIG. 7 is a block diagram of an example communication structure for the airport side including a camera.

FIG. 7 is a block diagram of an example communication structure 700 for the airport side 103 including a camera 700. On airport grounds, crewmembers can perform walk-around inspections looking for fluid leaks, ice accumulation, wear and tear, dents or damages undetected from previous flights. As an example, a BOEING 737 walk-around may involve checking airspeed probes, static ports, static discharge wicks, tip lights, engines fan blades, tires, wheel wells, brake accumulators, brake wear pins, hydraulic return filters, tail skids, fuel tank vents, auxiliary power units (APU) fire bottle indicators, etc. Pilots run their checklist, start the engines, and verify the oil pressure and temperature readings. Before pushback of the aircraft 102, onboard equipment have passed systems' built-in-tests. Freedom of movement of flight controls surfaces is checked, takeoff lights and transponder are turned on before the aircraft 102 is cleared for takeoff. With the addition of camera 700, topside and vertical tail of the aircraft 102 can also be checked. Antennas, probes and structural can be damaged by bird strikes, lightning bolts, hail storms, runway Foreign Object Debris (FOD), and accidental contact by ground service equipment/vehicles, and passenger loading bridges, etc.

The camera 700 and computer 702 of the crewman are connected with the antenna 402 and/or antenna 414 to send data from the camera 700 and data from/to the walk-around inspection on airport grounds to/from the airline server 104 and/or airport server 106. The IEEE 802.11a/b/g/n/ac standards can be used to send the data to antenna 402, and E-band backhaul, IEEE 80211aj QLinkPAN, Relay, 802.11s mesh network, PLC, etc. can be used to transfer data from the antenna 414 to rest of the airport infrastructure network 108. This mobile broadband connectivity can assist crewmember computers 702 and crewmembers to make decisions while conducting airplane inspections on airport ground and to maintain the aircraft 102. WiFi enabled walk-around can bypass the aircraft core network 202 and directly connect to airlines operation centers, e.g., airline server 104, via WiFi hotspots at terminal gates and the airport Ethernet backhaul. Additionally or alternatively, the gateway 302 of the aircraft 102 can be used to transfer/receive data. Crewmember computers 702 can download and upload images, conduct subsequent image processing and comparison before making a decision, e.g., regarding releasing the aircraft 102 and/or maintaining the aircraft 102.

The computers 702 can include handheld mobile tablets and the camera 700 can include high resolution video cameras with a spot light mounted on a turntable. The camera 700 can be capable of Pan-Tilt-Zoom close-up for up to a 20 m tail height and 70 m long fuselage of a BOEING 747-8. The turntable may reach to about 10 m in height by an extendable post. The camera 700 and computer 702 provide for a mobile unit capable of inspections over distance for remotely parked aircraft 102. Image upload, download, processing and comparison can occur for current versus previous and inspected versus expected views of the aircraft 102. A direct connection of the camera 700 and computer 702 allow for connectivity to airline operation centers, e.g., airline server 104, via the airport infrastructure network 108, without having to access the aircraft 102 onboard systems.

Many modifications and other embodiments set forth herein will come to mind to one skilled in the art having the benefit of the teachings presented in the foregoing descriptions and the associated drawings. Although specific terms are employed herein, they are used in a generic and descriptive sense only and not for purposes of limitation.

The invention claimed is:

1. A system to connect aircraft to networks on ground, the system comprising:
    a core network located on an aircraft;
    a gateway included with the core network and having one or more computer processors, the gateway connected with a plurality of links including a wireless link, an optical link, a wired link, and a crew wireless link; and
    where the gateway is configured to:
        receive, via the wireless link, data captured by a camera and transmitted via an antenna operatively connected to the camera, wherein the data comprises an image associated with the aircraft;
        determine connectivity availability and one or more data transfer conditions selected from an amount of bandwidth, a speed of data transmission, an amount of data to transfer, a channel condition, and a cost of using a selected channel; and
        automatically switch between at least two of the plurality of links in order to transfer the data from the core network to an airline server using at least two of a telecom service provider network, an airport service provider network, and an airport infrastructure network, based on the connectivity availability and the one or more data transfer conditions, whereafter the airline server returns a processed image used in maintenance of the aircraft.

2. The system of claim 1, where the core network includes an open data network connected with an isolated data network, and the isolated data network connected with a common data network of the aircraft.

3. The system of claim 1, where the airport infrastructure network includes a switch gateway.

4. The system of claim 3, where the airport infrastructure network includes an optical transceiver modem connected with the switch gateway.

5. The system of claim 3, where the airport infrastructure network includes a power line communication modem connected with the switch gateway.

6. The system of claim 1, where the at least two of the telecom service provider network, the airport service provider network and the airport infrastructure network are configured to send the data to the airline server.

7. The system of claim 6, further including at least one of a local area network and a wide area network connecting the at least two of the telecom service provider network, the airport service provider network and the airport infrastructure network with the airline server.

8. The system of claim 1, further including a remote access point, the remote access point configured to connect the aircraft to the airport infrastructure network when the aircraft is located remotely from a gate.

9. The system of claim 8, where the wireless link connects the aircraft to the remote access point.

10. The system of claim 8, where the remote access point is positioned at a light pole.

11. The system of claim 1,
    wherein the gateway is connected with at least three of the wireless link, the optical link, the wired link and the crew wireless link;
    wherein the gateway is configured to switch between the at least three of the wireless link, the optical link, the wired link and the crew wireless link to transfer data from the core network using the at least two of the telecom service provider network, the airport service provider network and the airport infrastructure network, based on the connectivity availability and based further on the one or more data transfer conditions.

12. The system of claim 11, wherein the one or more data transfer conditions include at least two of the amount of bandwidth, the speed of data transmission, the amount of data to transfer, the channel condition, and the cost of using the selected channel;
    wherein the gateway is configured to switch between the at least three of the wireless link, the optical link, the wired link and the crew wireless link to transfer data from the core network using the telecom service provider network, the airport service provider network and the airport infrastructure network, based on the connectivity availability and based further on the one or more data transfer conditions.

13. The system of claim 12, wherein the one or more data transfer conditions include at least three of the amount of bandwidth, the speed of data transmission, the amount of data to transfer, the channel condition, and the cost of using the selected channel;
    wherein the gateway is configured to switch between the wireless link, the optical link, the wired link and the crew wireless link to transfer data from the core network using the telecom service provider network, the airport service provider network and the airport infrastructure network, based on the connectivity availability and based further on the one or more data transfer conditions.

14. The system of claim 13, wherein the one or more data transfer conditions include at least four of the amount of bandwidth, the speed of data transmission, the amount of data to transfer, the channel condition, and the cost of using the selected channel.

15. The system of claim 14, wherein the one or more data transfer conditions include the amount of bandwidth, the speed of data transmission, the amount of data to transfer, the channel condition, and the cost of using the selected channel;
- wherein the airline server is of an airline local area network (LAN), wherein the airline LAN is operatively connected to an airport LAN via an airport wide access network (WAN), wherein the airport LAN includes an airport server, wherein the airport LAN is operatively connected to a switch gateway of the airport infrastructure network;
- wherein the wireless link is operatively connected to the airline LAN via the telecom service provider network, wherein the wireless link is operatively connected to the airport WAN via the airport service provider network, wherein each of the wireless link, the optical link, and the wired link is operatively connected to the airport LAN via the switch gateway of the airport infrastructure network.

16. The system of claim 15, wherein the telecom service provider network, the airport service provider network and the airport infrastructure network are each identified as being available based on airport configuration maps;
- wherein the data is associated with an inspection of the aircraft to identify fluid leaks, ice accumulation, wear and tear, dents, and damage, the inspection including inspection of airspeed probes, static ports, static discharge wicks, tip lights, engine fan blades, tires, wheel wells, brake accumulators, brake wear pins, hydraulic return filters, tail skids, fuel tank vents, auxiliary power units, fire bottle indicators, aircraft topside, and vertical tail.

17. The system of claim 16, where the core network includes an open data network connected with an isolated data network, wherein the isolated data network is connected with a common data network of the aircraft, where the airport infrastructure network includes a switch gateway;
- wherein the airport infrastructure network includes, in respective instances, an optical transceiver modem connected with the switch gateway and a power line communication modem connected with the switch gateway.

18. The system of claim 17, wherein the telecom service provider network, the airport service provider network and the airport infrastructure network are each configured to send the data to the airline server, wherein the system further includes a local area network and a wide area network connecting the telecom service provider network, the airport service provider network and the airport infrastructure network with the airline server;
- wherein the system further includes a remote access point, the remote access point configured to connect the aircraft to the airport infrastructure network when the aircraft is located remotely from a gate, wherein the wireless link connects the aircraft to the remote access point, wherein the remote access point is positioned at a light pole.

\* \* \* \* \*